United States Patent
Sun et al.

(10) Patent No.: US 12,100,841 B2
(45) Date of Patent: Sep. 24, 2024

(54) POSITIVE ELECTRODE SLURRY COMPOSITION, AND POSITIVE ELECTRODE SHEET PREPARED THEREOF, SECONDARY BATTERY, BATTERY MODULE, BATTERY PACK AND POWER CONSUMPTION APPARATUS

(71) Applicant: CONTEMPORARY AMPEREX TECHNOLOGY CO., LIMITED, Ningde (CN)

(72) Inventors: Xin Sun, Ningde (CN); Haotian Xie, Ningde (CN); Bangrun Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/446,063

(22) Filed: Aug. 8, 2023

(65) Prior Publication Data
US 2023/0395875 A1 Dec. 7, 2023

Related U.S. Application Data

(63) Continuation of application No. PCT/CN2022/074646, filed on Jan. 28, 2022.

(51) Int. Cl.
| | |
|---|---|
| *H01M 4/62* | (2006.01) |
| *H01M 4/136* | (2010.01) |
| *H01M 4/36* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 10/42* | (2006.01) |
| *H01M 4/02* | (2006.01) |
| *H01M 4/131* | (2010.01) |
| *H01M 10/0525* | (2010.01) |

(52) U.S. Cl.
CPC ........... *H01M 4/623* (2013.01); *H01M 4/136* (2013.01); *H01M 4/364* (2013.01); *H01M 4/38* (2013.01); *H01M 4/485* (2013.01); *H01M 4/505* (2013.01); *H01M 4/525* (2013.01); *H01M 4/5825* (2013.01); *H01M 4/622* (2013.01); *H01M 10/4235* (2013.01); *H01M 2004/021* (2013.01); *H01M 2004/028* (2013.01); *H01M 4/131* (2013.01); *H01M 10/0525* (2013.01); *H01M 2220/20* (2013.01)

(58) Field of Classification Search
CPC ...... H01M 4/38; H01M 4/364; H01M 4/5825; H01M 4/525; H01M 4/505; H01M 4/485; H01M 4/131; H01M 4/136; H01M 4/623; H01M 2004/028
See application file for complete search history.

(56) References Cited

U.S. PATENT DOCUMENTS

2014/0370383 A1   12/2014  Lim et al.

FOREIGN PATENT DOCUMENTS

| CN | 101263167 A | 9/2008 |
| CN | 110518298 A | 11/2019 |
| CN | 113903906 A | 1/2022 |

OTHER PUBLICATIONS

ISR for International Application PCT/CN2022/074646 mailed Oct. 12, 2022.

Written Opinion for International Application PCT/CN2022/074646 mailed Oct. 12, 2022.

*Primary Examiner* — Laura Weiner
(74) *Attorney, Agent, or Firm* — LADAS & PARRY LLP

(57) ABSTRACT

A positive electrode slurry composition, and a positive electrode sheet prepared thereof, a secondary battery, a battery module, a battery pack and a power consumption apparatus are described. The positive electrode slurry composition includes a positive electrode active material, a pre-lithiation material, and a binder, where the binder is shown in Formula (II)

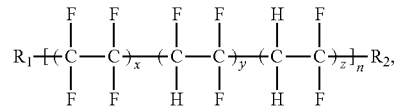

where $R_1$, $R_2$, x, y, and z have meanings defined in the specification, a volume average particle size is $D10 \geq 0.3$ μm, a volume average particle size D50 is 0.5-10 μm. The positive electrode slurry composition includes the binder in Formula (II) and the positive electrode active material with a specific particle size range, which is not easy to agglomerate and has high stability, and is conducive to improving machinability of the positive electrode sheet, and the binder in Formula (II) is conducive to improving bonding strength between the positive electrode active material and the pre-lithiation material.

19 Claims, 3 Drawing Sheets

1a

1b

1c

POSITIVE ELECTRODE SLURRY COMPOSITION, AND POSITIVE ELECTRODE SHEET PREPARED THEREOF, SECONDARY BATTERY, BATTERY MODULE, BATTERY PACK AND POWER CONSUMPTION APPARATUS

CROSS REFERENCE TO RELATED APPLICATIONS

This application is a continuation of International Patent Application No. PCT/CN2022/074646, filed on Jan. 28, 2022. The aforementioned patent applications are incorporated by reference in their entirety.

TECHNICAL FIELD

The present application relates to the technical field of secondary batteries, and in particular to a positive electrode slurry composition, and a positive electrode sheet prepared thereof, a secondary battery, a battery module, a battery pack and a power consumption apparatus.

BACKGROUND

Secondary batteries are widely applied in consumer electronics due to high energy density, long cycle life and no memory effect. In recent years, with the popularity of consumer electronics and new energy vehicles, consumers have put forward higher requirements for storage performance and safety performance of lithium ion batteries. How to design a lithium ion battery with excellent storage performance and good safety performance has become one of main research and development directions.

SUMMARY

The present application is completed in view of the above subject, which aims to provide a positive electrode slurry composition, such that a secondary battery corresponding to a positive electrode sheet prepared by the positive electrode slurry composition has good storage performance and safety performance.

To achieve the above aim, the present application provides a positive electrode slurry composition, and a positive electrode sheet prepared thereof, a secondary battery, a battery module, a battery pack and a power consumption apparatus.

A first aspect of the present application provides a positive electrode slurry composition, where the positive electrode slurry composition includes a positive electrode active material, a pre-lithiation material and a binder;

the positive electrode active material being selected from one or more of the following materials: $Li_qFe_pPO_4$, $Li_qCo_pPO_4$, $Li_qMn_pPO_4$, $Li_qCo_pO_2$, $Li_qNi_pO_2$, $Li_qMn_pO_2$, $Li_qMn_pO_4$, $Li_qNi_{a1}Co_bMn_cM^1_dO_2$, $Li_qNi_{1-u}Co_uO_2$, $Li_qCo_{1-u}Mn_uO_2$, $Li_qNi_{1-u}Mn_uO_2$, $Li_qNi_\alpha Co_\beta Mn_\gamma O_4$, $Li_qMn_{2-\eta}Ni_\eta O_4$, $Li_qMn2_{-\eta}Co_\eta O_4$, and modified materials thereof, where $M^1$ is selected from one or more of Al, Mo, Nd, and Zn, p and q independently satisfy $0.5 \leq q \leq 1.1$, $0.95 \leq p \leq 1.25$, $0 < a1 < 1$, $0 < b < 1$, $0 < c < 1$, $0 < d < 1$, and $a1+b+c+d=1$, u independently satisfies $0 < u < 1$, $0 < \alpha < 2$, $0 < \beta < 2$, $0 < \gamma < 2$, and $\alpha + \beta + \gamma = 2$, $\eta$ independently satisfies $0 < \eta < 2$, optionally $1 \leq \eta < 2$;

and where a volume average particle size of the positive electrode active material is $D10 \geq 0.3$ μm, a volume average particle size D50 is 0.5-10 μm, optionally 0.7-8 μm;

the pre-lithiation material being selected from one or more of the following materials: $Li_{a2}M^2O_{0.5(2+a2)}$, $Li_2M^2O_3$, $Li_2M^4O_4$, $Li_3M^5O_4$, $Li_5M^6O_4$, $Li_5M^7O_6$, $Li_2O$, $Li_2O_2$, $Li_2C_2O_4$, $Li_2C_3O_5$, $Li_2C_4O_4$, and $Li_2C_4O_6$, where $a2 \geq 1.2$, $M^2$ is selected from one or more of Ni, Co, Fe, Mn, Zn, Mg, Ca, Cu, and Sn, $M^3$ is selected from one or more of Ni, Co, Fe, Mn, Sn, and Cr, $M^4$ is selected from one or more of Ni, Co, Fe, Mn, Sn, Cr, V, and Nb, $M^5$ is selected from one or more of Ni, Co, Fe, Mn, Sn, Cr, V, Mo, and Nb, $M^6$ is selected from one or more of Ni, Co, Fe, Mn, Sn, Cr, and Mo, $M^7$ is selected from one or more of Ni, Co, and Mn and a valence state of each element in $M^2$, $M^3$, $M^4$, $M^5$, $M^6$, $M^7$ is respectively lower than a highest oxidation valence state thereof; and the binder being shown in Formula (II):

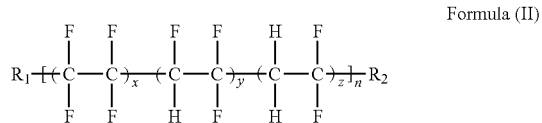

Formula (II)

where $R_1$ and $R_2$ are H or F independently of each other, x, y and z are all positive integers, and $0.52 \leq (4x+3y+2z)/(4x+4y+4z) \leq 0.7$.

In the present application, when the positive electrode slurry composition includes the above substances at the same time, in particular, the volume average particle size of the positive electrode active material is $D10 \geq 0.3$ μm. When the volume average particle size D50 is 0.5-10 μm, the slurry composition is not easy to agglomerate and has high stability, which is conducive to improving machinability of the positive electrode sheet. Therefore, a secondary battery including the positive electrode sheet prepared by the positive electrode slurry composition according to the first aspect of the present application has the good storage performance and safety performance.

In any embodiments, the positive electrode active material is selected from one or more of $Li_qFe_pPO_4$, $Li_qMn_2O_4$ or $Li_qNi_\alpha Co_\beta Mn_\gamma O_4$, and modified materials thereof, where p and q independently satisfy $0.5 \leq q \leq 1.1$, $0.95 \leq p \leq 1.25$, $0 < \alpha < 2$, $0 < \beta < 2$, $0 < \gamma < 2$, and $\alpha + \beta + \gamma = 2$.

In any embodiments, the positive electrode active material is selected from one or more of $Li_qFe_pPO_4$, and modified materials thereof, where $0.5 \leq q \leq 1.1$, optionally $0.8 \leq q \leq 1.1$, more optionally $0.9 \leq q \leq 1.1$, more optionally $0.95 \leq q \leq 1.05$, most optionally q=1, and $0.95 \leq p \leq 1.25$, and more optionally p=1.

In any embodiments, the positive electrode active material is selected from one or more of $Li_qFe_{p-k}Me_kPO_4$, where Me is selected from one or more of Sc, V, Cr, Mn, Ti, Al, Co, Ni, Cu, and Zn, optionally one or more of Mn, Ti, Al, Ni, Cu, and Zn, and $k<p$, $0<k \leq 0.5$, optionally $0.01 \leq k \leq 0.2$.

In any embodiments, lithium impurity content in the positive electrode active material is ≤3 weight %, optionally ≤2 weight %, based on a total weight of the positive electrode active material.

In any embodiments, the pre-lithiation material at least comprises lithium metal oxide shown in Formula (III),

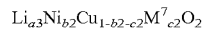

Formula (III)

where $1<a3<3$, $0<b2<1$, $0\leq c2<0.1$, and M7 is selected from one or more of Zn, Sn, Mg, Fe, and Mn, optionally, $1<a3\leq2$, $0<b2\leq0.6$, $0.01<c2<0.08$.

In any embodiments, a weight-average molecular weight of the binder in Formula (II) is 500 thousand to 1.2 million. The binder with the weight-average molecular weight within the above range is conducive to good manufacturability of the positive electrode sheet, and electrochemical performance of the corresponding secondary battery is also good.

In any embodiments, a mass fraction of the binder in Formula (II) in the positive electrode slurry composition is 0.2 wt %-10 wt %, optionally 0.5 wt %-7.5 wt %, further optionally 1 wt %-7.5 wt %, and more optionally 1 wt %-3 wt %.

When content of the binder in the positive electrode slurry composition is within the above range, a gel problem of the positive electrode slurry composition may be further alleviated, and a strong bonding effect may be formed between the pre-lithiation material and the positive electrode active material, such that the energy density and cycle life of a battery may both be improved.

In any embodiments, a mass fraction of the pre-lithiation material in the positive electrode slurry composition is 0.1 wt %-10 wt %, optionally 1.5 wt %-7 wt %.

When the mass fraction of the pre-lithiation material in the positive electrode slurry composition is within the above range, on the one hand, it may effectively make up for the loss of active lithium caused by the formation of SEI (solid electrolyte interphase) on a negative electrode, and on the other hand, it may also avoid the lack of reversible lithium intercalation vacancies on a positive electrode caused by the high content of pre-lithiation material, thereby affecting the energy density of a cell.

In any embodiments, a mass ratio of the pre-lithiation material to the binder in Formula (II) in the positive electrode slurry composition is 0.2-2, optionally 0.2-1.5, and further optionally 0.5-1.5.

In the positive electrode slurry composition, a proper mass ratio of the pre-lithiation material to the binder is conducive to further improving the cycle performance and safety performance of the battery.

In any embodiments, the volume average particle size D50 of the pre-lithiation material is 5 μm-15 μm.

In any embodiments, in addition to the binder shown in Formula (II), the positive electrode slurry composition further includes one or more of the following substances as the binder: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, ethylene-propylene-propadiene terpolymer or sulfonated ethylene-propylene-propadiene terpolymer, ethylene-propylene-butadiene terpolymer or sulfonated ethylene-propylene-butadiene terpolymer, ethylene-propylene-pentadiene terpolymer or sulfonated ethylene-propylene-pentadiene terpolymer, ethylene-propylene-hexadiene terpolymer or sulfonated ethylene-propylene-hexadiene terpolymer, styrene butadiene rubber, and fluorine rubber; and/or the positive electrode slurry composition further includes one or more of the following substances as a dispersant: sodium polyacrylate, sodium dodecyl benzene sulfonate, polypentene nitrile, polyacrylonitrile, and phenol polyoxyethylene ether.

A second aspect of the present application provides a positive electrode sheet, which is prepared from the positive electrode slurry composition according to the first aspect of the present application.

In any embodiments, a mass fraction of the positive electrode slurry composition in a film layer of the positive electrode sheet is not less than 80%, optionally not less than 90%, and further optionally not less than 95%.

A third aspect of the present application provides a secondary battery, which includes the positive electrode sheet according to the second aspect of the present application. A method of preparing the secondary battery known in the prior art may be used for preparing the secondary battery.

A fourth aspect of the present application provides a battery module, which includes the secondary battery according to the third aspect of the present application. A method of preparing the battery module known in the prior art may be used for preparing the battery module.

A fifth aspect of the present application provides a battery pack, which includes more than one of the secondary battery according to the third aspect of the present application or the battery module according to the fourth aspect of the present application. A method of preparing the battery pack known in the prior art may be used for preparing the battery pack.

A sixth aspect of the present application provides a power consumption apparatus, which includes more than one of the secondary battery according to the third aspect of the present application, or the battery module according to the fourth aspect of the present application, or the battery pack according to the fifth aspect of the present application. A method of preparing the power consumption apparatus known in the prior art may be used for preparing the power consumption apparatus.

Beneficial Effects

In the present application, the secondary battery includes the positive electrode sheet prepared from the positive electrode slurry composition of the present application, where the positive electrode slurry composition includes the positive electrode active material and the pre-lithiation material, and the pre-lithiation material may timely supplement active lithium consumed during the cycle and is conducive to improving the storage performance of lithium containing phosphate batteries. At the same time, adding the binder with fluorine substitution weight and molecular weight within a certain range to the positive electrode slurry composition may avoid physical gel caused by a long molecular chain of the binder, and improve a chemical gel problem of the positive electrode slurry composition. Furthermore, by limiting the volume average particle size of the positive electrode active material being $D10\geq0.3$ μm and the volume average particle size D50 being 0.5-10 μm, the problem of physical gel and chemical gel of the positive electrode slurry composition may be further improved, thereby improving the machinability of the positive electrode sheet. At the same time, the binder in Formula (II) is conducive to ensuring the bonding strength between the positive electrode active material and the pre-lithiation material in the positive electrode sheet, and improving the safety performance of the battery. In addition, the binder in Formula (II) may make holes on a surface of the positive electrode slurry composition, which is conducive to electrolytic solution infiltration, improving a liquid absorption rate and reducing a battery resistance.

The battery module, battery pack and power consumption apparatus of the present application include the secondary battery provided by the present application, so they have at least the same advantages as the secondary battery.

Figure 1:
FIG. 1 is a picture of gel states of a positive electrode slurry mild gel (FIG. 1a), moderate gel (FIG. 1b) and severe gel (FIG. 1c) according to the present application.
Figure 1:
Figure 1:
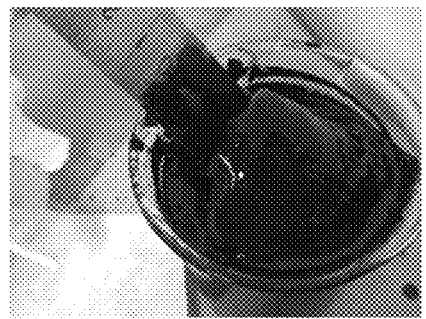

DESCRIPTION OF REFERENCE SIGNS 1 battery pack
2 upper box body
3 lower box body
4 battery module
5 secondary battery
51 housing
52 electrode assembly
53 top cover assembly

DETAILED DESCRIPTION

The following is a detailed description with reference to the drawings, specifically disclosing a positive electrode sheet and a preparation method thereof, a cell, a battery module, a battery pack and a power consumption apparatus including the same, but unnecessary detailed description may be omitted. For example, there are cases where detailed description of the well known matters and repeated description of the actual same structure are omitted, which is to avoid the following description becoming unnecessarily lengthy and easy for those skilled in the art to understand. In addition, the drawings and the following description are provided for those skilled in the art to fully understand the present application, and are not intended to limit the subject matters described in the claims.

For the sake of simplicity, the present application specifically discloses some numerical ranges, and various numerical ranges may be combined to form corresponding implementation solutions. Any lower limit may be combined with any upper limit to form an unspecified range, and likewise any lower limit may be combined with other lower limits to form an unspecified range, and any upper limit may be combined with any other upper limits to form an unspecified range. In addition, each separately disclosed point or single value itself may be used as a lower or upper limit to form an unspecified range with any other points or single values or with any other lower or upper limits.

Unless otherwise specified, the terms used in the present application have a common sense commonly understood by those skilled in the art. In the present application, unless otherwise specified, "more than" and "less than" include the number itself, for example, "more than one of a and b" refers to at least one of a and b, such as a, b, or a and b. Similarly, "one or more" refers to include at least one. In the description herein, unless otherwise specified, the term "or" is inclusive, that is, the phrase "A or (or) B" refers to "A, B, or both A and B".

It should be noted that in the present application, unless otherwise specified, a dry weight is used as a measurement basis for the mass fraction in the present application. For example, a mass fraction of a positive electrode slurry composition in a positive electrode film layer refers to a mass fraction of a dry weight of the positive electrode slurry composition in the positive electrode film layer, and for another example, a mass fraction of pre-lithiation material in the positive electrode slurry composition refers to a percentage of a mass of pre-lithiation material in a mass of the positive electrode slurry composition by dry weight. The term "dry weight" has a sense commonly understood by those skilled in the art, excluding the amount of solvent used to dissolve active ingredients, pre-lithiation materials, and the like.

It should be noted that in the present application, "modification" refers to the modification of materials to improve performance thereof. In the present application, the "modification" includes but is not limited to doping.

It should be noted that in this paper, a volume average particle size D10 refers to a particle size corresponding to a cumulative volume distribution percentage of a sample to be measured when it reaches 10%, and a volume average particle size D50 refers to the particle size corresponding to the cumulative volume distribution percentage of the sample to be measured when it reaches 50%. In the present application, the volume average particle size may be measured by a laser diffraction particle size analysis. For example, with reference to a standard GB/T 19077-2016, use a laser particle size analyzer (such as Malvern Master Size 3000) for measurement.

It should be noted that in a compound in Formula (II) in the present application, m=(4x+3y+2z)/(4x+4y+4z) represents the substitution amount of F element in the binder. Unless otherwise specified, "fluorine content" and "fluorine substitution amount" in the present application are synonymous and both refer to m. Unless otherwise specified, "mass" and "weight" in the present application are synonymous.

The inventors found in practical work that when adding a pre-lithiation material to a positive electrode sheet of a lithium secondary battery, if the pre-lithiation material is directly added to a positive electrode slurry, gel may occur in the positive electrode slurry, so as to affect coating of the positive electrode sheet, thereby affecting storage performance and safety performance of the secondary battery. In order to solve the above problem, the inventors accidentally found after a large amount of experiments that by including the binders of specific types and the positive electrode active materials of D10 and D50 within a specific range in the positive electrode slurry, a problem of gel produced by the positive electrode slurry may be effectively solved, so as to improve stability of the positive electrode slurry, thereby improving the storage performance and safety performance of the secondary battery.

[Positive Electrode Slurry Composition]

A first aspect of the present application provides a positive electrode slurry composition, where the positive electrode slurry composition includes a positive electrode active material, a pre-lithiation material and a binder;

the positive electrode active material being selected from one or more of the following materials: $Li_qFe_pPO_4$, $Li_qCo_pPO_4$, $Li_qMn_pPO_4$, $Li_qCo_pO_2$, $Li_qNi_pO_2$, $Li_qMn_pO_2$, $Li_qMn_pO_4$, $Li_qNi_{a1}Co_bMn_cM^1_dO_2$, $Li_q$ $Ni_{1-u}Co_uO_2$, $Li_qCo_{1-u}Mn_uO_2$, $Li_qNi_{1-u}Mn_uO_2$, $Li_qNi_\alpha Co_\beta Mn_\gamma O_4$, $Li_qMn_{2-\eta}Ni_\eta O_4$, $Li_qMn2_{-\eta}Co_\eta O_4$, and modified materials thereof, where $M^1$ is selected from one or more of Al, Mo, Nd, and Zn, p and q independently satisfy $0.5 \le q \le 1.1$, $0.95 \le p \le 1.25$, $0 < a1 < 1$, $0 < b < 1$, $0 < c < 1$, $0 < d < 1$, and $a1+b+c+d=1$, u independently satisfies $0 < u < 1$, $0 < \alpha < 2$, $0 < \beta < 2$, $0 < \gamma < 2$, and $\alpha+\beta+\gamma=2$, $\eta$ independently satisfies $0 < \eta < 2$, optionally $1 \le \eta < 2$;

and where a volume average particle size of the positive electrode active material is $D10 \ge 0.3$ μm, a volume average particle size D50 is 0.5-10 μm, optionally 0.7-8 μm;

the pre-lithiation material being selected from one or more of the following materials: $Li_{a2}M^2O_{0.5(2+a2)}$, $Li_2M^3O_3$, $Li_2M^4O_4$, $Li_3M_5O_4$, $Li_5M_6O_4$, $Li_5M^7O_6$, $Li_2O$, $Li_2O_2$, $Li_2C_2O_4$, $Li_2C_3O_5$, $Li_2C_4O_4$, and $Li_2C_4O_6$, where $a2 \ge 1.2$, $M^2$ is selected from one or more of Ni, Co, Fe, Mn, Zn, Mg, Ca, Cu, and Sn, $M^3$ is selected from one or more of Ni, Co, Fe, Mn, Sn, and Cr, $M^4$ is selected from one or more of Ni, Co, Fe, Mn, Sn, Cr, V, and Nb, $M^5$ is selected from one or more of Ni, Co, Fe, Mn, Sn, Cr, V, Mo, and Nb, $M^6$ is selected from one or more of Ni, Co, Fe, Mn, Sn, Cr, and Mo, $M^7$ is selected from one or more of Ni, Co, and Mn and a valence state of each element in $M^2$, $M^3$, $M^4$, $M^5$, $M^6$, $M^7$ is respectively lower than a highest oxidation valence state thereof; and the binding being shown in Formula (II):

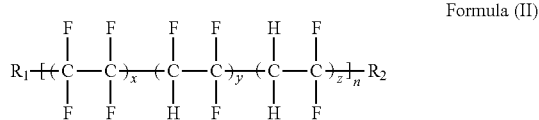

Formula (II)

where $R_1$ and $R_2$ are H or F independently of each other, x, y and z are all positive integers, and $0.52 \le (4x+3y+2z)/(4x+4y+4z) \le 0.7$.

In the binder in Formula (II), $m=(4x+3y+2z)/(4x+4y+4z)$ represents the substitution amount of F element in the binder. Optionally, when m is too small, there is a large amount of H in the positive electrode slurry, which may cause the binder to release a large amount of HF. On the one hand, it may cause inactivation of the binder and demoulding of the positive electrode sheet, and on the other hand, it may cause the positive electrode slurry to produce chemical gel, thereby seriously affecting capacity and reliability of the secondary battery. When m is too large, there is a large amount of F in the positive electrode slurry, indicating that there is more tetrafluoroethylene in the binder, which may be not conducive for the binder to give full play to its bonding role, so as to improve performance of the secondary battery. It should be noted that m may be measured by a test method known in the art, such as a nuclear magnetic resonance internal standard method, or by infrared spectroscopy using a reference substance with known fluorine content.

In addition, in the positive electrode slurry composition of the present application, the volume average particle size of the positive electrode active material is $D10 \ge 0.3$ μm. If the volume average particle size D10 is too small, it may cause a serious gel problem in the positive electrode slurry composition, which is not conducive to the processing of the positive electrode sheet. At the same time, the inventors found after a lot of researches that when the volume average particle size D50 of the positive electrode active material is less than 0.5 μm, even if there are fewer small particles in the positive electrode active material (volume average particle size $D10 \ge 0.3$ μm), the serious gel may still occur in the positive electrode slurry composition. When the volume average particle size D50 of the positive electrode active material is greater than 10 μm, a direct current internal resistance corresponding to the secondary battery gradually increases, which is not conducive to improving dynamic performance of the secondary battery.

In the present application, the positive electrode slurry composition includes the positive electrode active material and the pre-lithiation material, and the pre-lithiation material may timely supplement active lithium consumed in a cycle process and is conducive to improving the storage performance of lithium containing phosphate batteries. At the same time, adding the binder with fluorine substitution weight and molecular weight within a certain range to the positive electrode slurry composition may avoid physical gel caused by a long molecular chain of the binder, so as to improve a chemical gel problem of the positive electrode slurry composition. Furthermore, by limiting the volume average particle size of the positive electrode active material being $D10 \ge 0.3$ μm and the volume average particle size D50 being 0.5-10 μm, the problem of physical gel and chemical gel of the positive electrode slurry composition may be further improved, thereby improving the machinability of the positive electrode sheet. At the same time, the binder in Formula (II) is conducive to ensuring the bonding strength between the positive electrode active material and the pre-lithiation material in the positive electrode sheet, and improving the safety performance of the battery. In addition, the binder may make holes on a surface of a positive electrode, which is conducive to the electrolytic solution infiltration, improving the liquid absorption rate and reducing the battery resistance.

In some embodiments, optionally, the positive electrode active material is selected from one or more of $Li_qFe_pPO_4$, $Li_qMn_{2p}O_4$ or $Li_qNi_\alpha Co_\beta Mn_\gamma O_4$, and modified materials thereof, where p and q independently satisfy $0.5 \le q \le 1.1$, $0.95 \le p \le 1.25$, $0 < \alpha < 2$, $0 < \beta < 2$, $0 < \gamma < 2$, and $\alpha+\beta+\gamma=2$.

In some embodiments, optionally, the positive electrode active material is selected from one or more of $Li_qFe_pPO_4$, and modified materials thereof, where $0.5 \le q \le 1.1$, optionally $0.8 \le q \le 1.1$, more optionally $0.9 \le q \le 1.1$, more optionally $0.95 \le q \le 1.05$, most optionally $q=1$, and $0.95 \le p \le 1.25$, and more optionally $p=1$.

$Li_qFe_pPO_4$, and the modified materials thereof have high thermal stability, which is conducive to better high-temperature safety performance of the secondary battery. Moreover, the secondary battery may further have a longer high-temperature cycle life and higher high-temperature storage performance.

In some embodiments, optionally, the positive electrode active material is selected from one or more of $Li_qFe_{p-k}Me_kPO_4$, where Me is selected from one or more of Sc, V, Cr, Mn, Ti, Al, Co, Ni, Cu, and Zn, optionally one or more of Mn, Ti, Al, Ni, Cu, and Zn, and $k<p$, $0<k\le 0.5$, optionally $0.01 \le k \le 0.2$.

In some embodiments, optionally, the positive electrode active material is selected from one or more of $LiFePO_4$, $LiCoPO_4$, $LiMnPO_4$, $LiCoO_2$, $LiNiO_2$, $LiMnO_2$, $LiMn_2O_4$, $LiNi_{0.8}Co_{0.1}Mn_{0.1}O_2$, $LiFe_{0.7}Mn_{0.3}PO_4$, and modified materials thereof.

In some embodiments, optionally, lithium impurity content in the positive electrode active material is $\le 3$ weight %, optionally $\le 2$ weight %, based on a total weight of the positive electrode active material. In the present application, "lithium impurity" generally refers to some impurities introduced during synthesis or storage of positive electrode active materials, usually lithium carbonate, lithium bicarbonate, and lithium hydroxide.

In some embodiments, optionally, the pre-lithiation material at least comprises lithium metal oxide shown in Formula (III), $$Li_{a3}Ni_{b2}Cu_{1-b2-c2}M^7_{c2}O_2 \qquad \text{Formula (III)}$$

where $1<a3<3$, $0<b2<1$, $0\leq c2<0.1$, and M7 is selected from one or more of Zn, Sn, Mg, Fe, and Mn, optionally, $1<a3\leq 2$, $0<b2\leq 0.6$, $0.01<c2<0.08$.

When the lithium metal oxide shown in Formula (III) is selected as the pre-lithiation material in the positive electrode slurry composition, the positive electrode sheet prepared from the above positive electrode slurry composition has higher specific charge capacity and specific discharge capacity.

The inventors found that when the content of Cu in the lithium metal oxide shown in Formula (III) is low, there is relatively more NiO in the pre-lithiation material, which is not conducive to the exertion of capacity. Therefore, in order to achieve a good pre-lithiation material effect, optionally, in the lithium metal oxide shown in Formula (III), $1<a3\leq 2$, $0<b2\leq 0.6$, $0.01<c2<0.08$.

In some embodiments, optionally, the pre-lithiation material is selected from one or more of $Li_2Ni_{0.5}Cu_{0.5}O_2$, $Li_2Ni_{0.5}Cu_{0.4}Mn_{0.1}O_2$, $Li_2O_2$, and $Li_2C_2O_4$.

In some embodiments, optionally, a weight-average molecular weight of the binder in Formula (II) is 500 thousand to 1.2 million.

In the composition according to the first aspect of the present application, when the weight-average molecular weight of the binder is from 500 thousand to 1.2 million, the positive electrode sheet may acquire good manufacturability, and the corresponding electrochemical performance of the secondary battery is also good. When the weight-average molecular weight of the binder is too large, its molecular chain is long, which is easy to cause particle agglomeration and produce physical gel. When the weight-average molecular weight of the binder is too small, its molecular chain is short, which may cause insufficient bond, thereby causing the demoulding of the electrode sheet.

In some embodiments, optionally, a mass fraction of the binder in the positive electrode slurry composition is 0.2 wt %-10 wt %, optionally 0.5 wt %-7.5 wt %, further optionally 1 wt %-7.5 wt %, and more optionally 1 wt %-3 wt %.

A positive electrode active material layer includes an appropriate amount of the above binder, which may effectively alleviate a problem of slurry gel, and form a strong bonding effect between the pre-lithiation material and the positive electrode active material, such that the energy density and cycle life of the battery may both be improved. When the mass fraction of the binder in the positive electrode sheet is too small, the bond between the binder and active ingredients and the pre-lithiation material may be insufficient, causing the active substance and pre-lithiation material to fall off, leading to a safety problem. When the mass fraction of the binder in the positive electrode sheet is too large, conductivity of the electrode sheet may be poor, battery impedance may be deteriorated, and dynamic performance of the secondary battery may be affected.

In some embodiments, optionally, a mass fraction of the pre-lithiation material in the positive electrode slurry composition is 0.1 wt %-10 wt %, optionally 1.5 wt %-7 wt %.

When the content of pre-lithiation material is lower than the above range, the loss of positive electrode active lithium may not be compensated. When the content of pre-lithiation material is higher than the above range, it may cause insufficient reversible lithium intercalation vacancies in the positive electrode, affecting the energy density of the cell.

In some embodiments, optionally, a mass ratio of the pre-lithiation material to the binder in Formula (II) in the positive electrode slurry composition is 0.2-2, optionally 0.2-1.5, and further optionally 0.5-1.5.

Although a mechanism is still unclear, the inventors accidentally found that when the mass ratio of the pre-lithiation material to the binder is within the above range, it is conducive to giving full play to the bonding effect of the binder, inhibiting the physical gel and chemical gel of the positive electrode slurry composition, and improving the safety performance and storage performance of the secondary battery.

In some embodiments, optionally, the mass fraction of the positive electrode active material in the positive electrode slurry composition of the present application is 80 wt %-99.5 wt %, optionally 88 wt %-96 wt %.

In some embodiments, optionally, in the positive electrode slurry composition, the mass ratio of the pre-lithiation material to the positive electrode active material is 1.5:85-100, optionally 1.5:89-96.5.

In some embodiments, optionally, a volume average particle size D50 of the pre-lithiation material is 5 μm-15 μm.

In some embodiments, optionally, pH of the pre-lithiation material is ≤13, optionally, pH≤12.5, further optionally, 11≤pH≤12.5.

When the pH of the pre-lithiation material is within the above range, it is conducive to further reducing a risk of gel in the positive electrode slurry, further improving a pre-lithiation material effect, thereby improving the first charge-discharge capacity and cycle life of the battery. Since the pre-lithiation material used in the present application is highly sensitive to water, when the pH of the pre-lithiation material is too high, alkalinity of the pre-lithiation material is very strong, causing that a discharge gram capacity of the pre-lithiation material after water absorption may be affected, which is not conducive to improving battery performance.

It should be noted that a method commonly used by those skilled in the art, such as titration, may be used to determine the pH of the pre-lithiation material.

In some embodiments, optionally, an outer side of the lithium agent is coated with a single coating layer or multiple coating layers, and the coating layer includes one or more of the following materials: metal fluoride, oxides, metal phosphorous salts, lithium salts, elemental carbon, and five-membered heterocyclic polymers.

By coating the above coating layer on the outer side of the pre-lithiation material, on the one hand, it is conducive to improving the gel problem of the positive electrode slurry composition in the present application, and on the other hand, it may also effectively improve a technical problem that affects the exertion of the discharge gram capacity due to the strong alkalinity of the pre-lithiation material, thereby improving the storage performance of the battery.

In some embodiments, optionally, the coating layer includes one or more of the following materials: $AlF_3$, $V_2O_5$, $Al_2O_3$, $ZrO_2$, $TiO_2$, $ZnO$, $Co_3O_4$, $SiO_2$, $AlPO_4$, $FePO_4$, $Co_3(PO_4)_2$, $Ni_3(PO_4)_2$, $Li_3PO_4$, $Li_2MnO_3$, $LiAlO_2$, $Li_2TiO_3$, $Li_2ZrO_3$, graphene, carbon nanotubes, poly (3,4-ethylenedioxythiophene), and polypyrrole.

In some embodiments, optionally, a specific surface area of the pre-lithiation material is 0.5 m²/g-20 m²/g, optionally 1.0 m²/g-19 m²/g, further optionally 2 m²/g-18 m²/g, more optionally 5 m²/g-17 m²/g. The specific surface area may be tested by the method commonly used in the art, for example, according to a standard GB/T19587-2004.

By regulating the specific surface area of the pre-lithiation material within the above range, lithium ions consumed by the negative electrode may be effectively and timely replenished to ensure the number of active lithium, thereby improving the capacity performance of the secondary battery.

In some embodiments, optionally, in addition to the binder shown in Formula (II), the positive electrode slurry composition further includes one or more of the following substances as the binder: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, ethylene-propylene-propadiene terpolymer or sulfonated ethylene-propylene-propadiene terpolymer, ethylene-propylene-butadiene terpolymer or sulfonated ethylene-propylene-butadiene terpolymer, ethylene-propylene-pentadiene terpolymer or sulfonated ethylene-propylene-pentadiene terpolymer, ethylene-propylene-hexadiene terpolymer or sulfonated ethylene-propylene-hexadiene terpolymer, styrene butadiene rubber, and fluorine rubber; and/or the positive electrode slurry composition further comprises one or more of the following substances as a dispersant: sodium polyacrylate, sodium dodecyl benzene sulfonate, polypentene nitrile, polyacrylonitrile, and phenol polyoxyethylene ether.

The dispersant is added to the positive electrode slurry composition of the present application, which is conducive to increasing the porosity, reducing the lithium ion migration resistance, thereby reducing the direct current impedance and improving the dynamic performance.

In some embodiments, optionally, the dispersant is phenol polyoxyethylene ether.

[Positive Electrode Sheet]

A second aspect of the present application provides a positive electrode sheet, where the positive electrode sheet is prepared from the positive electrode slurry composition according to the first aspect of the present application.

The positive electrode sheet includes a positive electrode current collector and a positive electrode film layer provided on at least one surface of the positive electrode current collector, and the positive electrode film layer includes the positive electrode slurry composition according to the first aspect of the present application.

As an example, the positive electrode current collector has two surfaces opposite in its own thickness direction, and the positive electrode film layer is provided on either or both of the two opposite surfaces of the positive electrode current collector.

In some embodiments, the positive electrode current collector may be metal foil or a composite current collector. For example, as the metal foil, aluminum foil may be used. The composite current collector may include a polymer material base layer and a metal layer formed on at least one surface of the polymer material substrate. The composite current collector may be formed by forming a metal material (aluminium, aluminium alloys, nickel, nickel alloys, titanium, titanium alloys, silver and silver alloys, etc.) on the base layer of polymer material (such as polypropylene (PP), polyethylene terephthalate (PET), polybutylene terephthalate (PBT), polystyrene (PS), polyethylene (PE) and other substrates).

In some embodiments, optionally, the positive electrode film layer may further include a conductive agent. As an example, the conductive agent may include at least one of superconducting carbon, acetylene black, carbon black, Ketjen black, carbon dots, carbon nanotubes, graphene, and carbon nanofibers.

In some embodiments, optionally, the mass fraction of the positive electrode slurry composition in the film layer of the positive electrode sheet is not less than 80%, optionally not less than 90%, and further optionally not less than 95%.

In some embodiments, the positive electrode sheet may be prepared by dispersing the above components used to prepare the positive electrode sheet, such as positive electrode active material, pre-lithiation material, binder, conductive agent and any other components in a solvent (such as N-methylpyrrolidone) to form a positive electrode slurry, coating the positive electrode slurry on the positive electrode current collector, and then conducting drying, cold pressing and other processes. Therefore, the positive electrode sheet may be acquired.

[Negative Electrode Sheet]

A negative electrode sheet includes a negative electrode current collector and a negative electrode film layer provided on at least one surface of the negative electrode current collector, and the negative electrode film layer includes a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may adopt metal foil or a composite current collector. For example, as the metal foil, copper foil may be used. The composite current collector may include a polymer material base layer and a metal layer formed on at least one surface of the polymer material substrate. The composite current collector may be formed by forming a metal material (copper, copper alloys, nickel, nickel alloys, titanium, titanium alloys, silver and silver alloys, etc.) on the base layer of polymer material (such as polypropylene (PP), polyethylene terephthalate (PET), polybutylene terephthalate (PBT), polystyrene (PS), polyethylene (PE) and other substrates).

In some embodiments, a negative electrode active material may use a negative electrode active material for a battery known in the art. As an example, the negative electrode active material may include at least one of the following materials: artificial graphite, natural graphite, soft carbon, hard carbon, silicon-based material, tin-based material, lithium titanate, and the like. The silicon-based material may be selected from at least one of elementary silicon, silicon oxide compound, silicon carbon composite, silicon nitrogen composite, and silicon alloy. The tin-based material may be selected from at least one of elemental tin, tin oxide compound, and tin alloy. However, the present application is not limited to these materials, and other conventional materials that may be used as the negative electrode active material for the battery may also be used. One type of these negative electrode active materials may be used alone, or two or more types may be used in combination.

In some embodiments, the negative electrode film layer may also optionally include a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer may further optionally include a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer may also optionally include other additives, such as a thickener (such as sodium carboxymethyl cellulose (CMC-Na)).

In some embodiments, the negative electrode sheet may be prepared by dispersing the above components for preparing the negative electrode sheet, such as negative electrode active material, conductive agent, binder, and any other components in a solvent (such as deionized water) to form a negative electrode slurry, coating the negative electrode slurry on the negative electrode current collector, and then conducting drying, cold pressing and other processes. Therefore, the negative electrode sheet may be acquired.

[Electrolytic Solution]

An electrolyte plays the role of conducting ions between a positive electrode sheet and a negative electrode sheet. The type of the electrolyte is not specifically limited in the present application, and may be selected according to the requirements. For example, the electrolyte may be liquid, gelatinous or all solid.

In some embodiments, the electrolyte adopts an electrolytic solution. The electrolytic solution includes an electrolyte salt and a solvent.

In some embodiments, the electrolyte salt may be selected from at least one of lithium hexafluorophosphate, lithium tetrafluoroborate lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoroacetate borate, lithium borate oxalate, lithium difluorobisoxalate phosphate, and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolytic solution may further optionally include an additive. For example, the additive may include a negative electrode film-forming additive, a positive electrode film-forming additive, and an additive that may improve certain performance of a battery, such as an additive that improves overcharging performance of the battery, an additive that improves high-temperature or low-temperature performance of the battery.

[Separator]

In some embodiments, a secondary battery further includes a separator. The type of the separator is not specifically limited in the present application, and any well-known porous-structure separator with good chemical stability and mechanical stability may be selected.

In some embodiments, a material of the separator may be selected from at least one of glass fiber, nonwoven fabric, polyethylene, polypropylene, and polyvinylidene fluoride. The separator may be a single-layered thin film or a multi-layered composite thin film, which is not specifically limited. When the separator is the multi-layered composite thin film, the materials of each layer may be the same or different, which are not specifically limited.

In some embodiments, the positive electrode sheet, the negative electrode sheet and the separator may be subject to a winding process or a lamination process, to acquire an electrode assembly.

[Secondary Battery]

A third aspect of the present application provides a secondary battery, which includes the positive electrode sheet according to the second aspect of the present application.

Generally, the secondary battery includes a positive electrode sheet, a negative electrode sheet, an electrolyte and a separator. During charging and discharging of a battery, active ions are intercalated and disintercalated back and forth between the positive electrode sheet and the negative electrode sheet. The electrolyte plays the role of conducting ions between the positive electrode sheet and the negative electrode sheet. The separator is provided between the positive electrode sheet and the negative electrode sheet, which mainly plays the role of preventing a short circuit of positive and negative electrodes and may simultaneously allow the ions to pass through.

In some embodiments, a lithium ion secondary battery may include an outer packing. The outer packing may be used to package the above electrode assembly and electrolyte.

In some embodiments, the outer packing of the lithium ion secondary battery may be a hard housing, such as a hard plastic housing, an aluminum housing, a steel housing, and the like. The outer packing of the lithium ion secondary battery may also be a soft package, for example, a soft bag package. A material of the soft package may be plastic, for example, polypropylene (PP), polybutylene terephthalate (PBT), and polybutylene succinate (PBS).

In addition, the secondary battery, the battery module, the battery pack and the power consumption apparatus of the present application will be described below with reference to the drawings as appropriate.

Figure 2:
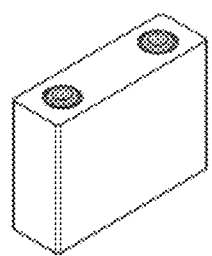
FIG. 2 is a schematic diagram of a secondary battery according to an embodiment of the present application.

The present application has no specific limitation on the shape of the secondary battery, and the secondary battery may be of a cylindrical, square, or any other shape. For example, FIG. 2 is a secondary battery 5 in a square structure as an example.

Figure 3:
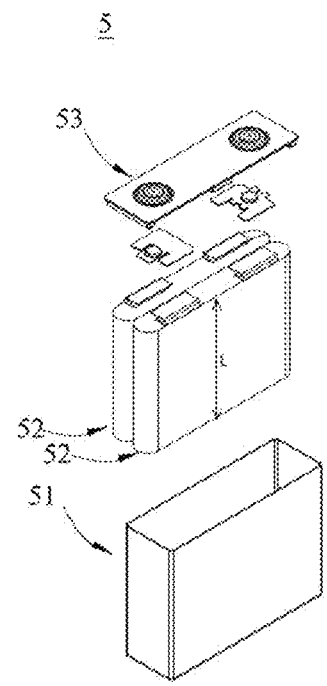
FIG. 3 is an exploded view of the secondary battery according to the embodiment of the present application shown in FIG. 2.

In some embodiments, with reference to FIG. 3, an outer packaging may include a housing 51 and a cover plate 53. The housing 51 may include a bottom plate and side plates connected to the bottom plate, and the bottom plate and the side plates are enclosed to form an accommodating cavity. The housing 51 has an opening communicating with the accommodating cavity, and the cover plate 53 may cover the opening to close the accommodating cavity. The positive electrode sheet, the negative electrode sheet, and the separator may form an electrode assembly 52 through a winding process or a lamination process. The electrode assembly 52 is packaged in the accommodating cavity. An electrolytic solution is infiltrated in the electrode assembly 52. The number of electrode assemblies 52 included in the secondary battery 5 may be one or more, and those skilled in the art may select them according to the specific actual requirements.

In some embodiments, lithium ion secondary batteries may be assembled into the battery module, the number of lithium ion batteries included in the battery module may be one or more, and the specific number may be selected by those skilled in the art based on application and capacity of the battery module.

Figure 4:
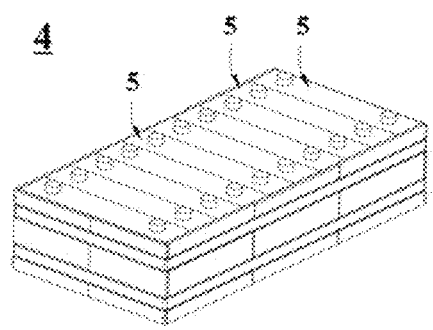
FIG. 4 is a schematic diagram of a battery module according to an embodiment of the present application.

FIG. 4 is a battery module 4 as an example. With reference to FIG. 4, in the battery module 4, a plurality of lithium ion batteries 5 may be provided along a length direction of the battery module 4 in sequence. Certainly, they may be arranged in any other manner. Further, the plurality of lithium ion batteries 5 may be fixed with fasteners.

Optionally, the battery module 4 may further include a housing with an accommodating space, and the plurality of lithium ion batteries 5 are accommodated in the accommodating space.

In some embodiments, the above battery modules may be further assembled into a battery pack, and the number of battery modules included in the battery pack may be one or more, and a specific number may be selected by those skilled in the art according to application and capacity of the battery pack.

Figure 5:
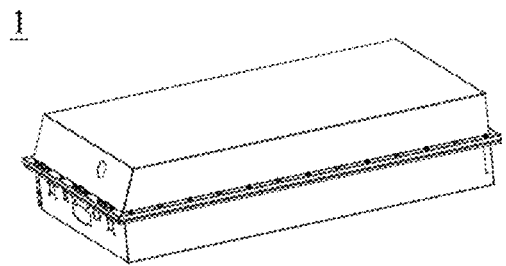
FIG. 5 is a schematic diagram of a battery pack according to an embodiment of the present application.
Figure 6:
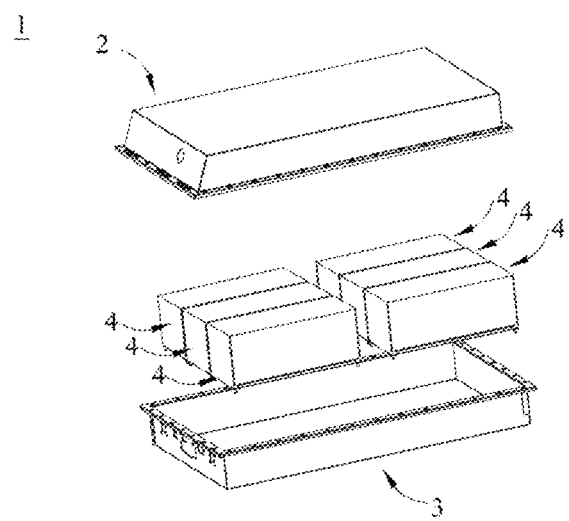
FIG. 6 is an exploded view of the battery pack according to the embodiment of the present application shown in FIG. 5.

FIG. 5 and FIG. 6 are a battery pack 1 as an example. With reference to FIG. 5 and FIG. 6, the battery pack 1 may include a battery box and a plurality of battery modules 4 provided in the battery box. The battery box includes an upper box body 2 and a lower box body 3. The upper box body 2 may cover the lower box body 3 and form an enclosed space for accommodating the battery modules 4. The plurality of battery modules 4 may be arranged in the battery box in any manner.

In addition, the present application further provides a power consumption apparatus, and the power consumption apparatus includes at least one of a secondary battery, a battery module, or a battery pack provided by the present application. The secondary battery, the battery module, or the battery pack may be used as a power source of the power consumption apparatus, or as an energy storage unit of the power consumption apparatus. The power consumption apparatus may include, but be not limited to, mobile devices (such as mobile phones, and notebook computers), electric vehicles (such as full electric vehicles, hybrid electric vehicles, plug-in hybrid electric vehicles, electric bicycles, electric scooters, electric golf carts, and electric trucks), electric trains, ships and satellites, energy storage systems, and the like.

As the power consumption apparatus, the secondary battery, the battery module, or the battery pack may be selected according to the usage requirements thereof.

Figure 7:
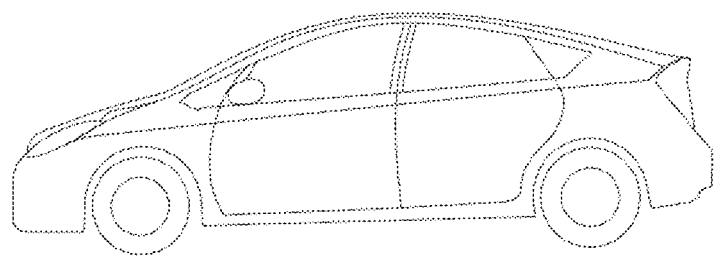
FIG. 7 is a schematic diagram of a power consumption apparatus according to an embodiment of the present application.

FIG. 7 is a power consumption apparatus as an example. The power consumption apparatus is a full electric vehicle, a hybrid electric vehicle, a plug-in hybrid electric vehicle, and the like. To satisfy requirements of the power consumption apparatus for high power and a high energy density of a secondary battery, a battery pack or a battery module may be used.

In another example, the apparatus may be a mobile phone, a laptop, a notebook computer, and the like. The apparatus usually requires lightness and thinness, and the secondary battery may be used as a power source.

EMBODIMENTS

Embodiments of the present application will be described hereinafter. The embodiments described below are illustrative and merely used to explain the present application, but should not be understood as limitations to the present application. If no specific technique or condition is indicated in the embodiments, it shall be carried out in accordance with the technique or condition described in literature in the art or in accordance with a product specification. Reagents or instruments used without indicating manufacturers are conventional products that are commonly used in the art and available commercially. The content of each component in the embodiments of the present application is calculated by dry weight without crystal water unless otherwise specified.

The sources of raw materials involved in the embodiments of the present application are as shown in the following table:

| Name | Manufacturer and brand | CAS number, molecular weight and other information |
|---|---|---|
| Conductive agent carbon black | Shanghai Macklin Biochemical Co., Ltd | CAS: 1333-86-4 |
| Polyvinylidene fluoride (PVDF) | Shanghai Macklin Biochemical Co., Ltd | CAS: 24937-79-9, with a weight-average molecular weight of 900 thousand |
| N-methylpyrrolidone (NMP) | Shanghai Macklin Biochemical Co., Ltd | CAS: 872-50-4 |
| Styrene Butadiene Rubber (SBR) | Shanghai Macklin Biochemical Co., Ltd | CAS: 9003-55-8 |
| Ethylene carbonate (EC) | Shanghai Macklin Biochemical Co., Ltd | CAS: 96-49-1 |
| Dimethyl carbonate (DMC) | Shanghai Macklin Biochemical Co., Ltd | CAS: 616-38-6 |
| Carboxymethylcellulose sodium | Sigma-Aldrich | CAS: 9004-32-4 |
| Lithium iron phosphate (4 types, lithium impurity content is 4%, 3%, 2%, 1.5%, respectively) | Shanghai Macklin Biochemical Co., Ltd | CAS: 15365-14-7 |
| 3-Allyloxy-2-hydroxy-1-propanesulfonicacid sodium | Shanghai Macklin Biochemical Co., Ltd | CAS: 52556-42-0 |
| 1,1-difluoroethylene | Shanghai Macklin Biochemical Co., Ltd | CAS: 75-38-7 |
| 2,2'-Azobis(2-methylpropionitrile) | Shanghai Macklin Biochemical Co., Ltd | CAS: 75804-30-7 |
| Acrylic acid | Shanghai Macklin Biochemical Co., Ltd | CAS: 79-10-7 |
| Tetrafluoroethene | Shanghai Macklin Biochemical Co., Ltd | CAS: 116-14-3 |

| Name | Manufacturer and brand | CAS number, molecular weight and other information |
|---|---|---|
| Dodecyl benzyl alcohol | Shanghai Macklin Biochemical Co., Ltd | Structural formula 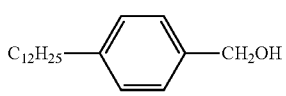 |
| Lithium peroxide | Shanghai Macklin Biochemical Co., Ltd | CAS: 12031-80-0 |
| Lithium oxalate | Shanghai Macklin Biochemical Co., Ltd | CAS: 553-91-3 |

Preparation methods of binder A, binder B and binder C used in the following embodiments are as follows:

Preparation of Binder A:

Add 20 kg deionized water to a 50 L high pressure reactive kettle and vacuum it; then start to stir, and add 80 g 3-Allyloxy-2-hydroxy-1-propanesulfonicacid sodium (AHPS, calculated as $C_6H_{11}NaO_5S$); add 10 kg VDF (that is, 1,1-difluoroethylene, calculated as $C_2H_2F_2$) monomer to the reactive kettle adopting a separator compressor, pressurize to the set reaction pressure (6 MPa), and stir for 60 min; then add 50 g 2,2'-azodiisobutyronitrile (AIBN, calculated as $C_8H_{12}N_4$), and close a feed valve of the reactive kettle; raise a temperature of the reactive kettle to 70° C. and heat it for 5 h; gradually add 0.9 kg ethyl acetate (add 20% every hour) within 5 h, and then add 100 g acetone (99.5% purity) to terminate the reaction, and recover the unreacted monomer; for the acquired lotion whose temperature is above 70° C., use mechanical agitation to break emulsion and wash with the deionized water; after conductivity of washing water is measured to be ≤5 μs/cm, place the acquired lotion in a 100° C. vacuum oven to dry for 24 h, and the acquired PVDF resin is the binder A.

A test method of the conductivity is as follows: refer to a standard HG/T 4067-2015; use a conductivity meter DDSJ-318 to first flush an electrode with the tested sample water for 2-3 times, while conducting temperature correction and repeating sampling and measurement for 2-3 times; when a measurement result and a relative error are both within 3%, it is a final result.

Preparation of Binder B:

Add 20 kg deionized water to a 50 L high pressure reactive kettle and vacuum it; then start to stir and add 80 g 3-Allyloxy-2-hydroxy-1-propanesulfonicacid sodium (AHPS, calculated as $C_6H_{11}NaO_5S$); add 9.5 kg VDF (that is, 1,1-difluoroethylene, calculated as $C_2H_2F_2$) monomer and 0.5 kg acrylic acid (calculated as $C_3H_4O_2$) monomer to the reactive kettle adopting a separator compressor, pressurize to the set reaction pressure (8 MPa), and stir for 60 min; then add 50 g 2,2'-azodiisobutyronitrile (AIBN, calculated as $C_8H_{12}N_4$), and close a feed valve of the reactive kettle; raise a temperature of the reactive kettle to 70° C. and heat it for 16 h; gradually add 0.5 kg ethyl acetate (add 20% every three hours) within 16 h, and then add 100 g acetone (99.5% purity) to terminate the reaction, and recover the unreacted monomer; for the acquired lotion whose temperature is above 70° C., use mechanical agitation to break emulsion and wash with the deionized water; after conductivity of washing water is measured to be ≤5 μs/cm, place the acquired lotion in a 100° C. vacuum oven to dry for 24 h, and the acquired PVDF resin is the binder B.

Preparation of Binder C:

Add 20 kg deionized water to a 50 L high pressure reactive kettle and vacuum it; then start to stir and add 80 g 3-Allyloxy-2-hydroxy-1-propanesulfonicacid sodium (AHPS, calculated as $C_6H_{11}NaO_5S$); add 7.5 kg VDF (that is, 1,1-difluoroethylene, calculated as $C_2H_2F_2$) monomer and 2.5 kg TFE (that is, tetrafluoroethylene, calculated as $C_2F_4$) monomer to the reactive kettle adopting a separator compressor, pressurize to the set reaction pressure (6 MPa), and stir for 60 min; then add 50 g 2,2'-azodiisobutyronitrile (AIBN, calculated as $C_8H_{12}N_4$), and close a feed valve of the reactive kettle; raise a temperature of the reactive kettle to 70° C. and heat it for 16 h; gradually add 1.05 kg ethyl acetate (add 20% every hour) within 5 h, and then add 100 g acetone (99.5% purity) to terminate the reaction, and recover the unreacted monomer; for the acquired lotion whose temperature is above 70° C., use mechanical agitation to break emulsion and wash with the deionized water; after conductivity of washing water is measured to be ≤5 μs/cm, place the acquired lotion in a 100° C. vacuum oven to dry for 24 h, and the acquired PVDF resin is the binder C.

Comparative Example 1

Preparation of a negative electrode sheet: dissolve graphite, a conductive agent of acetylene black, a binder of styrene butadiene rubber (SBR), and a thinkener of carboxymethylcellulose sodium (CMC) in a solvent of deionized water according to a mass ratio of 96.5 parts by weight:0.7 parts by weight:1.8 parts by weight:1 parts by weight, and fully stir and evenly mix to acquire a negative electrode slurry; evenly coat the negative electrode slurry on a copper foil of a negative electrode current collector, and conduct drying, cold pressing, and slitting to acquire the negative electrode sheet. With regards to the negative electrode active material layer acquired, a surface density of is 9.8 mg/cm² and a compaction density is 1.65 g/cm³.

Preparation of a positive electrode sheet: mix an active substance $LiFePO_4$ (LFP) with lithium impurity content of 1.5%, a conductive agent of acetylene black, and a binder A with a mass ratio of 96.5:2:1.5, and dissolve them in a solvent N-methylpyrrolidone (NMP), and fully stir and evenly mix to acquire a positive electrode slurry, where a volume average particle size D10 of an active substance $LiFePO_4$ particle is 0.45 μm, and a volume average particle size D50 is 1.2 μm; then evenly coat the positive electrode slurry on an aluminum foil, and conduct drying, cold pressing, and slitting to acquire the positive electrode sheet. With regards to the positive electrode active material layer acquired, a surface density is 19.5 mg/cm² and a compaction density is 2.4 g/cm³.

Preparation of an electrolytic solution: evenly mix an organic solvent of ethyl carbonate (EC)/ethyl methyl sarbonate (EMC) according to a weight ratio of 50/50, add $LiPF_6$ and dissolve it in the above organic solvent, and evenly stir to make a concentration of $LiPF_6$ 1.1 mol/L to acquire the electrolytic solution.

Preparation of a full battery: stack the positive electrode sheet, the separator and the negative electrode sheet acquired above in sequence to make the separator between positive and negative electrodes play the role of separation, and wind them to acquire a bare cell; place the bare cell in an outer packaging, inject the above electrolytic solution and package to acquire the full battery (hereinafter also referred to as "full power").

Comparative Example 2

Except during the preparation of a positive electrode sheet, an active substance $LiFePO_4$ of 1.5 parts by weight is replaced by a pre-lithiation material $Li_2Ni_{0.5}Cu_{0.5}O_2$(L) of 1.5 parts by weight, other conditions of comparative example 2 are the same as those of comparative example 1.

Comparative Example 3

Except during the preparation of a positive electrode sheet, a volume average particle size D10 of an active substance $LiFePO_4$ particle is 0.22 μm, a volume average particle size D50 is 1.2 μm, and a binder A is replaced by a binder C in equal parts by weight, other conditions of comparative example 3 are the same as those of comparative example 2.

Comparative Example 4

Except during the preparation of a positive electrode sheet, $LiFePO_4$ is replaced by a positive electrode active material $LiNi_{0.8}Co_{0.1}Mn_{0.1}O_2$(NCM) particle in equal parts by weight and with a volume average particle size D10 being 2.33 μm and a volume average particle size D50 being 4.5 μm, and a binder A is replaced by a binder B in equal parts by weight, other conditions of comparative example 4 are the same as those of comparative example 1.

Comparative Example 5

Except during the preparation of a positive electrode sheet, an active substance $LiNi_{0.8}Co_{0.1}Mn_{0.1}O_2$(NCM) of 1.5 parts by weight is replaced by $Li_2Ni_{0.5}Cu_{0.5}O_2$(L) of 1.5 parts by weight, other conditions of comparative example 5 are the same as those of comparative example 4.

Comparative Example 6

Except during the preparation of a positive electrode sheet, an active substance $LiFePO_4$ is replaced by $LiMn_2O_4$ (LMO) in equal parts by weight and with a volume average particle size D10 being 3.62 μm and a volume average particle size D50 being 4.9 μm, and a binder A is replaced by a binder B in equal parts by weight, other conditions of comparative example 6 are the same as those of comparative example 1.

Comparative Example 7

Except during the preparation of a positive electrode sheet, an active substance $LiMn_2O_4$ (LMO) of 1.5 parts by weight is replaced by $Li_2Ni_{0.5}Cu_{0.5}O_2$ (L) of 1.5 parts by weight, other conditions of comparative example 7 are the same as those of comparative example 6.

Comparative Example 8

Except during the preparation of a positive electrode sheet, $LiFePO_4$ is replaced by a positive electrode active material $LiFe_{0.7}Mn_{0.3}PO_4$ particle in equal parts by weight and with a volume average particle size D10 being 0.45 μm and a volume average particle size D50 being 1.2 μm, other conditions of comparative example 8 are the same as those of comparative example 1.

Comparative Example 9

Except during the preparation of a positive electrode sheet, an active substance $LiFe_{0.7}Mn_{0.3}PO_4$ of 1.5 parts by weight is replaced by a pre-lithiation material $Li_2Ni_{0.5}Cu_{0.5}O_2$(L) of 1.5 parts by weight, other conditions of comparative example 9 are the same as those of comparative example 8.

Comparative Example 10

Except during the preparation of a positive electrode sheet, a volume average particle size D10 of an active substance $LiFePO_4$ particle is 0.45 μm, a volume average particle size D50 is 1.2 μm, and lithium impurity content is 4%, other conditions of comparative example 10 are the same as those of comparative example 3.

Embodiment 1

Except during the preparation of a positive electrode, a positive electrode active material $LiFePO_4$ is replaced by $LiFePO_4$ in equal parts by weight and with a volume average particle size D10 being 0.45 μm and a volume average particle size D50 being 0.7 μm and a binder A is replaced by a binder C in equal parts by weight, other conditions of embodiment 1 are the same as those of comparative example 2.

Embodiment 2

Except during the preparation of a positive electrode sheet, a positive electrode active material $LiFePO_4$ is replaced by $LiFePO_4$ in equal parts by weight and with a volume average particle size D10 being 0.45 μm and a volume average particle size D50 being 0.9 μm other conditions of embodiment 2 are the same as those of embodiment 1.

Embodiment 3

Except during the preparation of a positive electrode sheet, a positive electrode active material $LiFePO_4$ is replaced by $LiFePO_4$ in equal parts by weight and with a volume average particle size D10 being 0.45 μm and a volume average particle size D50 being 1.2 μm other conditions of embodiment 3 are the same as those of embodiment 1.

Embodiment 4

Except during the preparation of a positive electrode sheet, a positive electrode active material $LiFePO_4$ is replaced by LiFePO$_4$ in equal parts by weight and with a volume average particle size D10 being 0.45 μm and a volume average particle size D50 being 2 μm other conditions of embodiment 4 are the same as those of embodiment 1.

Embodiment 5

Except during the preparation of a positive electrode sheet, a positive electrode active material LiFePO$_4$ is replaced by LiFePO$_4$ in equal parts by weight and with a volume average particle size D10 being 0.45 μm and a volume average particle size D50 being 7 μm, other conditions of embodiment 5 are the same as those of embodiment 1.

Embodiment 6

Except during the preparation of a positive electrode sheet, a positive electrode active material LiFePO$_4$ is replaced by LiFePO$_4$ in equal parts by weight and with a volume average particle size D10 being 0.39 μm and a volume average particle size D50 being 1.2 μm, other conditions of embodiment 6 are the same as those of embodiment 1.

Embodiment 7

Except during the preparation of a positive electrode sheet, a positive electrode active material LiFePO$_4$ is replaced by LiFePO$_4$ in equal parts by weight and with a volume average particle size D10 being 0.31 μm and a volume average particle size D50 being 1.2 μm, other conditions of embodiment 7 are the same as those of embodiment 1.

Embodiment 8

Except during the preparation of a positive electrode sheet, a weight ratio of an active substance LiFePO$_4$ (LFP), a conductive agent of acetylene black, and a binder C to a pre-lithiation material in a positive electrode slurry composition is 89:2:7.5:1.5, other conditions of embodiment 8 are the same as those of embodiment 3.

Embodiment 9

Except during the preparation of a positive electrode sheet, a weight ratio of an active substance LiFePO$_4$ (LFP), a conductive agent of acetylene black, and a binder C to a pre-lithiation material in a positive electrode slurry composition is 93.5:2:3:1.5, other conditions of embodiment 9 are the same as those of embodiment 3.

Embodiment 10

Except during the preparation of a positive electrode sheet, a weight ratio of an active substance LiFePO$_4$ (LFP), a conductive agent of acetylene black, and a binder C to a pre-lithiation material in a positive electrode slurry composition is 95.5:2:1:1.5, other conditions of embodiment 10 are the same as those of embodiment 3.

Embodiment 11

Except during the preparation of a positive electrode sheet, a binder B is replaced by a binder C in equal parts by weight, other conditions of embodiment 11 are the same as those of comparative example 5.

Embodiment 12

Except during the preparation of a positive electrode sheet, a binder B is replaced by a binder C in equal parts by weight, other conditions of embodiment 12 are the same as those of comparative example 7.

Embodiments 13-14

Except during the preparation of a positive electrode sheet, lithium impurity content of the positive electrode active material LiFePO$_4$ (LFP) used is 3% and 2%, respectively, other conditions of embodiments 13-14 are the same as those of comparative example 10.

Embodiment 15

Except during the preparation of a positive electrode sheet, a positive electrode active material LFP is replaced by LiFe$_{0.7}$Mn$_{0.3}$PO$_4$ in equal parts by weight, other conditions of embodiment 15 are the same as those of embodiment 3.

Embodiment 16

Except during the preparation of a positive electrode sheet, a pre-lithiation material is replaced by Li$_2$Ni$_{0.5}$Cu$_{0.4}$Mn$_{0.1}$O$_2$ in equal parts by weight, other conditions of embodiment 17 are the same as those of embodiment 3.

Embodiments 17-18

Except during the preparation of a positive electrode sheet, a pre-lithiation material Li$_2$Ni$_{0.5}$Cu$_{0.5}$O$_2$ is replaced by Li$_2$O$_2$ and Li$_2$C$_2$O$_4$ in equal parts by weight, respectively, other conditions of embodiments 18-19 are the same as those of embodiment 3.

Test Methods of Relevant Parameters

1. Test Method of Volume Average Particle Size

Refer to a standard GB/T 19077-2016/ISO 13320: 2009 particle size distribution laser diffraction method; use a laser particle size analyzer (Malvern 3000, MasterSizer 3000) to test, and a main light source uses a helium neon red light source; take a clean small beaker, add a 1 g sample to be tested, add a drop of surfactant, add 20 ml deionized water (a sample concentration shall ensure shading degree is 8~12%), and ultrasound at 53 KHz/120 W for 5 min to ensure complete dispersion of the sample; turn on the laser particle size analyzer, and automatically test background after cleaning an optical system; stir an ultrasonic solution to be tested to make it evenly disperse, place it in a sample tank as required, and start to measure a particle size, so acquire a measurement result.

2. Test of Weight-Average Molecular Weight of Binder

Test a weight-average molecular weight of a binder by gel permeation chromatography (refer to a standard: GB/T 21863-2008, and gel permeation chromatography GPC uses tetrahydrofuran as eluent).

Use N-methylpyrrolidone (NMP) to prepare a 0.3 weight % solution of a binder to be tested; take a sampling bottle to take a 0.5 ml solution of the binder to be tested, and set a sample volume be at 30~100 μL; install a chromatographic column and a pipeline, turn on a chromatograph (Waters e2695), and a mobile phase passes through a 0.45 μm disposable filter (to remove particulates, insoluble glue, binders, and the like), and degas with ultrasonic; so acquire the weight-average molecular weight of the binder by testing after 2~4 times of cleaning.

3. Test of Nuclear Magnetic Resonance Fluoride Content (Internal Standard Method)

Use a nuclear magnetic resonance fluorine content tester (PQ001, Newmark Technology), turn on it and adjust a test temperature to 32° C., take 0.3 g standards (known that F content of hexafluorobenzene is $n_1=10\%$ (mass fraction)), put them in the nuclear magnetic resonance fluorine content tester, preheat for ten minutes, and start a test to acquire a nuclear magnetic resonance fluorine spectrum signal intensity $x_1$; use the same test method to test the signal intensities of 0.4 g and 0.5 g hexafluorobenzene, and draw a standard curve of fluoride content; take a 1 g sample to be tested and dissolve it in 9 g N-methylpyrrolidone according to a 10% mass fraction to acquire a solution to be tested; place a 0.3 g solution to be tested in the nuclear magnetic resonance fluorine content tester, repeat for three times to acquire the tested signal intensities $y_1$, $y_2$ and $y_3$, and take an average value of the three times to calculate F content $n_2$ acquired (that is, fluorine substitution amount m).

The sample to be tested $n2=n1*(y_1+y_2+y_3)/3x_1$

4. Test of Lithium Impurity Content

A test may be made with reference to a standard: GB/T 9725-2007 Chemical Reagent-General Rule for Potentiometric Titration. An exemplary test method is as follows: adopt a 905 Titrando potentiometric titrator with a composite pH electrode; take 30 g lithium rich metal oxide and place it in an iodine flask, add 100 mL deionized water, and disperse at 25° C. at a speed of 360 RPM/min for 30 min; after standing for 10 min, use a 0.45 µt millipore filter for vacuum filtration to acquire a dispersion; then titrate the dispersion with a 0.05 mol/L HCl solution; and calculate content of free lithium and a mass proportion of the free lithium in lithium rich metal oxide according to titer.

5. Test of Charge Specific Capacity and Discharge Specific Capacity

Charge at a constant current rate of 0.33 C at a normal atmospheric temperature (25° C.) to a limited charge voltage, then charge at a constant voltage to 0.05 C to measure a charge capacity Ec0, and divide a positive electrode active material mass of a battery by Ec0 to acquire a charge specific capacity.

Take the above charged battery, and discharge it to a limited discharge voltage at the constant current rate of 0.33 C to measure a discharge capacity Ed0, and divide the positive electrode active material mass of the battery by Ed0 to acquire a discharge specific capacity.

Repeat tests of charge specific capacity and discharge specific capacity for 5 times, respectively, and take an average value to acquire the charge specific capacity and the discharge specific capacity in Table 3.

Specific charge capacity (mAh/g)=charge capacity of first cycle/positive electrode active material mass Discharge specific capacity (mAh/g)=discharge capacity of first cycle/positive electrode active material mass 6. Gel Condition and Interface Condition Test of Gel Condition:

Seal a fresh slurry in a beaker with a preservative film;
(1) Take out the standing slurry, and use a mobile phone to take a picture of a front logo and sealing condition of the beaker;
(2) Open the preservative film, gently stir a slurry surface with a steel ruler, and check whether the slurry surface is abnormal and color changes.
(3) Slowly probe the steel ruler into the slurry, and gently move it up and down to preliminarily judge viscosity of the slurry; according to a viscosity test standard DB13/T 5026.1-2019, measure viscosity condition of the slurry with a viscosity tester and record data;
(4) Use the steel ruler to scoop out part of the slurry, check fluidity of the slurry, and take the photo and record.

Observe a gel state of the slurry after standing for 24 h, and the gel state is divided into the following grades:

a. Mild gel (as shown in FIG. 1a): the slurry has good fluidity, but there is obvious reflection on a liquid level, and the bottom boundary of the slurry flow is protruding from the liquid level.

b. Moderate gel (as shown in FIG. 1b): the slurry has poor fluidity and is flocculent, and the slurry is flocculent, but has no solid property and no jelly lumps.

c. Serious gel (as shown in FIG. 1c): the slurry has no fluidity and is jelly like, and the slurry presents solid property, has no fluidity, and may be lifted as a whole.

Test of Interface Condition:

Place the coated electrode sheet under an electron microscope CCD (Quantum QLS scope), magnify it by 50~100 times, and observe surface morphology.

7. Test of 50% SOC 4 C 10 s (the 10th second) Direct Current Resistance (mΩ)

Charge a secondary battery to be tested at a rate of 1 C at a normal atmospheric temperature until a voltage is 3.65V, then discharge it at the rate of 1 C until the voltage is 2.5V, and measure a reversible capacity E0 by directly reading an instrument.

Charge the secondary battery to be tested at a rate of 0.33 C at the normal atmospheric temperature until the voltage is 3.65V, then discharge it at the rate of 0.33 C for 90 min, adjust a state of a cell to 50% SOC (that is, 50% quantity of electricit), and record that a voltage at this time is $U_{initial}$, and then continue to discharge it at the rate of 4 C for 30 seconds, and record that a voltage when discharging for 10 seconds is $U_{end}$; and calculate a resistance corresponding to the 10th second according to the following formula.

$$DCR=(U_{initial}-U_{end})/I$$

8. Test of 60° C. 100D Storage Retention Rate

Charge a secondary battery to be tested at a rate of 1 C at a normal atmospheric temperature until a voltage is 3.65V, then discharge it at the rate of 1 C until the voltage is 2.5V, and measure a reversible capacity E0 by directly reading an instrument; then put the secondary battery in a fully charged state in an oven at 60° C., take the battery out every 20 day, and immediately test a reversible capacity thereof and record it as En.

Calculate a capacity retention rate of a battery before and after storage at 60° C. according to the following formula: $\varepsilon=(En-E0)/E0\times100\%$.

The capacity retention rate in Table 3 is measured by the above methods after 100 days of storage.

TABLE 1

List of Experimental Conditions During Preparation of Binders A, B and C

| Binder No | Substance type | F substitution amount | Weight-average molecular weight/ten thousand | Added amount of ethyl acetate/kg | Reaction time/h | Temperature/ °C. | Pressure/ MPa | VDF/ kg | TFE/ kg |
|---|---|---|---|---|---|---|---|---|---|
| A | PVDF resin | 0.49 | 70 | 0.9 | 5 | 70 | 6 | 10 | 0 |
| B | PVDF resin | 0.47 | 110 | 0.5 | 16 | 70 | 8 | 9.5 | 0 |
| C | PVDF resin | 0.62 | 70 | 1.05 | 5 | 70 | 6 | 7.5 | 2.5 |

TABLE 2

List of Experimental Conditions for Embodiments 1-18 and Comparative Examples 1-10

| Embodiment No | Active substance | D10 of positive electrode active material (μm) | D50 of positive electrode active material (μm) | Content of pre-lithiation material/ wt % | Weight ratio of pre-lithiation material to binder in Formula (II) | Binder |
|---|---|---|---|---|---|---|
| Embodiment 1 | LEP | 0.45 | 0.7 | 1.5 | 1.0 | Binder C |
| Embodiment 2 | LEP | 0.45 | 0.9 | 1.5 | 1.0 | Binder C |
| Embodiment 3 | LEP | 0.45 | 1.2 | 1.5 | 1.0 | Binder C |
| Embodiment 4 | LEP | 0.45 | 2 | 1.5 | 1.0 | Binder C |
| Embodiment 5 | LEP | 0.45 | 7 | 1.5 | 1.0 | Binder C |
| Embodiment 6 | LEP | 0.39 | 1.2 | 1.5 | 1.0 | Binder C |
| Embodiment 7 | LEP | 0.31 | 1.2 | 1.5 | 1.0 | Binder C |
| Embodiment 8 | LEP | 0.45 | 1.2 | 1.5 | 0.2 | Binder C |
| Embodiment 9 | LEP | 0.45 | 1.2 | 1.5 | 0.5 | Binder C |
| Embodiment 10 | LEP | 0.45 | 1.2 | 1.5 | 1.5 | Binder C |
| Embodiment 11 | NCM | 2.33 | 4.5 | 1.5 | 1.0 | Binder C |
| Embodiment 12 | LMO | 3.62 | 4.9 | 1.5 | 1.0 | Binder C |
| Embodiment 13 | LEP | 0.45 | 1.2 | 1.5 | 1.0 | Binder C |
| Embodiment 14 | LEP | 0.45 | 1.2 | 1.5 | 1.0 | Binder C |
| Embodiment 15 | $LiFe_{0.7}Mn_{0.3}PO_4$ | 0.45 | 1.2 | 1.5 | 1.0 | Binder C |
| Embodiment 16 | LEP | 0.45 | 1.2 | 1.5 | 1.0 | Binder C |
| Embodiment 17 | LEP | 0.45 | 1.2 | 1.5 | 1.0 | Binder C |
| Embodiment 18 | LEP | 0.45 | 1.2 | 1.5 | 1.0 | Binder C |
| Comparative example 1 | LEP | 0.45 | 1.2 | 0 | / | Binder A |
| Comparative example 2 | LEP | 0.45 | 1.2 | 1.5 | 1.0 | Binder A |
| Comparative example 3 | LEP | 0.22 | 1.2 | 1.5 | 1.0 | Binder C |
| Comparative example 4 | NCM | 2.33 | 4.5 | 0 | / | Binder B |
| Comparative example 5 | NCM | 2.33 | 4.5 | 1.5 | 1.0 | Binder B |
| Comparative example 6 | LMO | 3.62 | 4.9 | 0 | / | Binder B |
| Comparative example 7 | LMO | 3.62 | 4.9 | 1.5 | 1.0 | Binder B |
| Comparative example 8 | LiFe0.7Mn0.3PO4 | 0.45 | 1.2 | 0 | / | Binder A |
| Comparative example 9 | LiFe0.7Mn0.3PO 4 | 0.45 | 1.2 | 1.5 | 1.0 | Binder A |
| Comparative example 10 | LEP | 0.45 | 1.2 | 1.5 | 1.0 | Binder C |
| Remarks | Lithium impurity content in a positive electrode active material LFP is 3% and 2%, respectively, in embodiments 13-14, the lithium impurity content in the positive electrode active material LFP is 4% in comparative example 10, and the lithium impurity content in the positive electrode active material LFP is 1.5% in other embodiments and comparative examples, based on a total mass of positive electrode active materials. | | | | | |

TABLE 3

List of Test Results for Embodiments 1-18 and Comparative examples 1-10

| Embodiment No | Charge specific capacity (mAh/g) | Discharge specific capacity (mAh/g) | Gel condition | Interface condition | 50% SOC 4C 10 s direct current resistance (mΩ) | 60° C. 100D storage retention rate (%) |
|---|---|---|---|---|---|---|
| Embodiment 1 | 166.5 | 144.8 | Mild gel | Some holes and pits | 22.55 | 94.20% |
| Embodiment 2 | 166.8 | 145.2 | Mild gel | Some holes and pits | 21.57 | 94.80% |
| Embodiment 3 | 166.1 | 145.6 | No gel | Some holes and pits | 21.32 | 95.90% |
| Embodiment 4 | 165.6 | 145.1 | No gel | Some holes and pits | 21.88 | 95.60% |
| Embodiment 5 | 164.5 | 144.3 | No gel | Micro holes and pits | 22.35 | 95.20% |
| Embodiment 6 | 166.3 | 145.7 | No gel | Some holes and pits | 21.18 | 95.80% |
| Embodiment 7 | 166.7 | 144.9 | Mild gel | Some holes and pits | 21.68 | 94.70% |
| Embodiment 8 | 159.9 | 141.1 | Moderate gel | More holes and pits | 23.73 | 93.50% |
| Embodiment 9 | 161.9 | 143.8 | Mild gel | Some holes and pits | 22.28 | 94.80% |
| Embodiment 10 | 164.4 | 145.1 | No gel | Some holes and pits | 21.59 | 95.10% |
| Embodiment 11 | 215.8 | 180 | No gel | Some holes and pits | 16.65 | 97.20% |
| Embodiment 12 | 111.2 | 95.2 | No gel | Some holes and pits | 32.18 | 86.90% |
| Embodiment 13 | 163.9 | 143.8 | No gel | Some holes and pits | 22.04 | 93.70% |
| Embodiment 14 | 164.7 | 144.8 | No gel | Some holes and pits | 21.67 | 94.40% |
| Embodiment 15 | 164.2 | 143.2 | No gel | Some holes and pits | 25.92 | 93.40% |
| Embodiment 16 | 165.2 | 144.3 | No gel | Some holes and pits | 21.89 | 95.40% |
| Embodiment 17 | 164.5 | 143.7 | No gel | Some holes and pits | 22.72 | 94.50% |
| Embodiment 18 | 163.2 | 142.3 | No gel | Some holes and pits | 23.28 | 93.40% |
| Comparative example 1 | 161.2 | 140.9 | No gel | Smooth interface | 21.87 | 91.50% |
| Comparative example 2 | / | / | Serious gel | Cannot be coated | / | / |
| Comparative example 3 | 163.6 | 142.7 | Moderate gel | Some holes and pits | 23.29 | 93.20% |
| Comparative example 4 | 211 | 183.2 | No gel | Smooth interface | 16.81 | 94.50% |
| Comparative example 5 | 213.5 | 178.9 | Serious gel | Agglomeration of large particles and uneven coating | 18.43 | 94.80% |
| Comparative example 6 | 105.3 | 97.2 | No gel | Smooth interface | 32.96 | 82.50% |
| Comparative example 7 | 109.5 | 94.9 | Serious gel | Agglomeration of large particles and uneven coating | 35.53 | 83.20% |
| Comparative example 8 | 159.2 | 140.8 | No gel | Smooth interface | 26.88 | 90.20% |
| Comparative example 9 | 163.5 | 139.3 | Serious gel | Agglomeration of large particles and uneven coating | 29.43 | 91.90% |
| Comparative example 10 | 162.7 | 142.4 | Moderate gel | More holes and pits | 23.97 | 92.60% |

It may be seen from Table 2 and Table 3 that adding the binder C is conducive to improving stability of the positive electrode slurry composition, and adding the pre-lithiation material is conducive to improving the storage performance of the secondary battery. In addition, when the volume average particle size of positive electrode active material D10 is ≥0.3, and the volume average particle size D50 is 0.5-10 μm, the stability of the positive electrode slurry composition is good, no serious gel occurs, there are fewer holes and pits on the positive electrode surface, and the corresponding storage performance of the secondary battery is also good. Further, the stability of the positive electrode slurry composition and the storage performance of the secondary battery may be further improved by optimizing parameters such as the volume average particle sizes D10 and D50 of the positive electrode active material, the mass ratio of the pre-lithiation material to the binder, and the lithium impurity content in the positive electrode film layer.

It should be noted that the present application is not limited to the above embodiments. The above embodiments are merely examples, and the embodiments having substantially the same configuration as the technical idea and exerting the same effect within the scope of the technical solutions of the present application are all included in the technical scope of the present application. In addition, various modifications may be made to the embodiments by those skilled in the art without departing from the spirit and scope of the present application, and other embodiments that are constructed by combining some of the constituent elements of the embodiments are also included in the scope of the present application.

What is claimed is:

1. A positive electrode slurry composition, comprising a positive electrode active material, a pre-lithiation material and a binder;
the positive electrode active material being selected from one or more of the group consisting of: $Li_qFe_pPO_4$, $Li_qCo_pPO_4$, $Li_qMn_pPO_4$, $Li_qCo_pO_2$, $Li_qNi_pO_2$, $Li_qMn_pO_2$, $Li_qMn_pO_4$, $Li_qNi_{a1}Co_bMn_cM1_dO_2$, $Li_qNi_{1-u}Co_uO_2$, $Li_qCo_{1-u}Mn_uO_2$, $Li_qNi_{1-u}Mn_uO_2$, $Li_qNi_\alpha Co_\beta Mn_\gamma O_4$, $Li_qMn_{2-\eta}Ni_\eta O_4$, and $Li_qMn_{2-\eta}Co_\eta O_4$, wherein M1 is selected from one or more of the group consisting of Al, Mo, Nd, and Zn, p and q independently satisfy $0.5 \leq q \leq 1.1$, $0.95 \leq p \leq 1.25$, $0 < a1 < 1$, $0 < b < 1$, $0 < c < 1$, $0 \leq d < 1$, and $a1+b+c+d=1$, u independently satisfies $0 < u < 1$, $0 < \alpha < 2$, $0 < \beta < 2$, $0 < \gamma < 2$, and $\alpha+\beta+\gamma=2$, $\eta$ independently satisfies $0 < \eta < 2$,
and wherein a volume average particle size of the positive electrode active material is $D10 \geq 0.3$ μm, a volume average particle size D50 is 0.5-10 μm;
the pre-lithiation material being selected from one or more of the group consisting of: $Li_{a2}M2O_{0.5(2+a2)}$, $Li_2M2O_3$, $Li_2M4O_4$, $Li_3M5O_4$, $Li_5M6O_4$, $Li_5M7O_6$, $Li_2O$, $Li_2O_2$, $Li_2C_2O_4$, $Li_2C_3O_5$, $Li_2C_4O_4$, and $Li_2C_4O_6$, wherein $a2 \geq 1.2$, M2 is selected from one or more of the group consisting of Ni, Co, Fe, Mn, Zn, Mg, Ca, Cu, and Sn, M3 is selected from one or more of the group consisting of Ni, Co, Fe, Mn, Sn, and Cr, M4 is selected from one or more of the group consisting of Ni, Co, Fe, Mn, Sn, Cr, V, and Nb, M5 is selected from one or more of the group consisting of Ni, Co, Fe, Mn, Sn, Cr, V, Mo, and Nb, M6 is selected from one or more of the group consisting of Ni, Co, Fe, Mn, Sn, Cr, and Mo, M7 is selected from one or more of the group consisting of Ni, Co, and Mn, and a valence state of each element in M2, M3, M4, M5, M6, and M7 is respectively lower than a highest oxidation valence state thereof; wherein a mass fraction of the pre-lithiation material in the positive electrode slurry composition is 0.1 wt %-10 wt % and
the binder being shown in Formula (II):

$$R_1 \text{---} \left( \left( \begin{array}{c} F \\ | \\ C \\ | \\ F \end{array} \text{---} \begin{array}{c} F \\ | \\ C \\ | \\ F \end{array} \right)_x \left( \begin{array}{c} F \\ | \\ C \\ | \\ H \end{array} \text{---} \begin{array}{c} F \\ | \\ C \\ | \\ F \end{array} \right)_y \left( \begin{array}{c} H \\ | \\ C \\ | \\ H \end{array} \text{---} \begin{array}{c} F \\ | \\ C \\ | \\ F \end{array} \right)_z \right)_n \text{---} R_2 \quad \text{Formula (II)}$$

wherein R1 and R2 are H or F independently of each other, x, y and z are all positive integers, and $0.52 \leq (4x+3y+2z)/(4x+4y+4z) \leq 0.7$.

2. The positive electrode slurry composition according to claim 1, wherein
the positive electrode active material is selected from one or more selected from the group consisting of $Li_qFe_pPO_4$, $Li_qMn_{2p}O_4$ and $Li_qNi_\alpha Co_\beta Mn_\gamma O_4$, wherein p and q independently satisfy $0.5 \leq q \leq 1.1$, $0.95 \leq p \leq 1.25$, $0 < \alpha < 2$, $0 < \beta < 2$, $0 < \gamma < 2$, and $\alpha+\beta+\gamma=2$.

3. The positive electrode slurry composition according to claim 1, wherein
the positive electrode active material is $Li_qFe_pPO_4$, wherein $0.5 \leq q \leq 1.1$, and $0.95 \leq p \leq 1.25$.

4. The positive electrode slurry composition according to claim 3, wherein
the positive electrode active material is $Li_qFe_{p-k}Me_kPO_4$, wherein Me is selected from one or more of the group consisting of Sc, V, Cr, Mn, Ti, Al, Co, Ni, Cu, and Zn, and $k < p$, and $0 < k \leq 0.5$.

5. The positive electrode slurry composition according to claim 1, wherein
lithium impurity content in the positive electrode active material is $\leq 3$ weight %, based on a total weight of the positive electrode active material.

6. The positive electrode slurry composition according to claim 1, wherein the pre-lithiation material at least comprises lithium metal oxide shown in Formula (III), $$Li_{a3}Ni_{b2}Cu_{1-b2-c2}M7_{c2}O_2 \quad \text{Formula (III)}$$

wherein $1 < a3 < 3$, $0 < b2 < 1$, $0 \leq c2 < 0.1$, and M7 is selected from one or more of the group consisting of Zn, Sn, Mg, Fe, and Mn.

7. The positive electrode slurry composition according to claim 1, wherein a weight-average molecular weight of the binder in Formula (II) is 500 thousand to 1.2 million.

8. The positive electrode slurry composition according to claim 1, wherein
a mass fraction of the binder in Formula (II) in the positive electrode slurry composition is 0.2 wt %-10 wt.

9. The positive electrode slurry composition according to claim 1, wherein
a mass fraction of the pre-lithiation material in the positive electrode slurry composition is 0.1 wt %-10 wt %.

10. The positive electrode slurry composition according to claim 1, wherein
a mass ratio of the pre-lithiation material to the binder in Formula (II) in the positive electrode slurry composition is 0.2-2.

11. The positive electrode slurry composition according to claim 1, wherein
volume average particle size D50 of the pre-lithiation material is 5 μm-15 μm.

12. The positive electrode slurry composition according to claim 1, wherein
the binder is selected from one or more of the group consisting of: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, ethylene propylene propadiene terpolymer or sulfonated ethylene propylene propadiene terpolymer, ethylene propylene butadiene terpolymer or sulfonated ethylene propylene butadiene terpolymer, ethylene propylene pentadiene terpolymer or sulfonated ethylene propylene pentadiene terpolymer, ethylene propylene hexadiene terpolymer or sulfonated ethylene propylene hexadiene terpolymer, styrene butadiene rubber, and fluorine rubber; and/or the positive electrode slurry composition further comprises a dispersant selected from one or more of the group consisting of: sodium polyacrylate, sodium dodecyl benzene sulfonate, polypentene nitrile, polyacrylonitrile, and phenol polyoxyethylene ether.

13. A positive electrode sheet comprising a positive electrode slurry composition according to claim 1.

14. The positive electrode sheet according to claim 13, wherein a mass fraction of the positive electrode slurry composition in a film layer of the positive electrode sheet is not less than 80%.

15. A secondary battery comprising the positive electrode sheet according to claim 13.

16. A battery module comprising the secondary battery according to claim 15.

17. A battery back comprising the battery module according to claim 16.

18. A battery pack comprising more than one of the secondary battery according to claim 15.

19. A power consumption apparatus comprising more than one of the secondary battery according to claim 15.

* * * * *